Jan. 24, 1928.

G. MAAS 1,657,266

SECTIONAL WATER TUBE BOILER

Filed Sept. 13, 1926

Inventor
Georg Maas

Patented Jan. 24, 1928.

1,657,266

UNITED STATES PATENT OFFICE.

GEORG MAAS, OF NUREMBERG, GERMANY.

SECTIONAL WATER-TUBE BOILER.

Application filed September 13, 1926, Serial No. 135,196, and in Germany June 15, 1925.

This invention relates to certain new and useful improvements in sectional water tube boilers and has for its primary object to construct a boiler with the tube banks set low into the furnace structure with the water and steam headers or chambers, and connecting pipes therefor, so disposed as to permit unobstructed upward removal of the tube banks for repair or other purposes.

An embodiment of the invention is shown by way of example, in the accompanying drawing, in which Fig. 1 shows in elevation a single boiler heated on one side with a maximum efficiency bank of water tubes connected without intermediate element to the unheated steam collecting drum.

Figure 1:
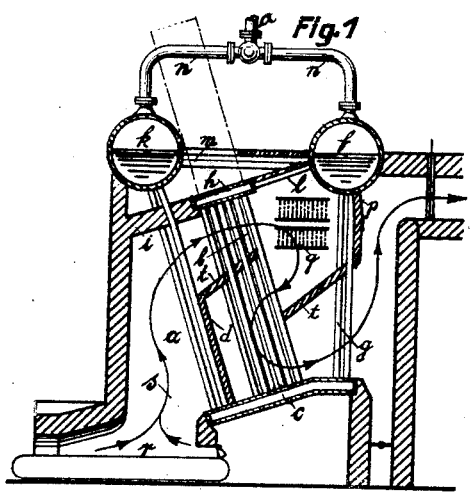
Figure 2:
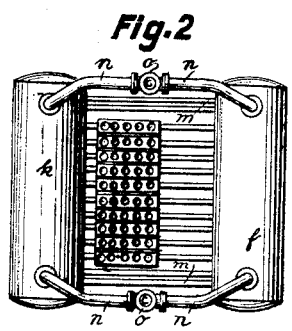
Fig. 2 is a plan view of Fig. 1.

Referring to Figs. 1 and 2 $a$ is the most strongly heated, steep maximum efficiency bank of water tubes consisting of a few water tubes, and $b$ is the less strongly heated, steep low efficiency bank of water tubes comprising a greater number of tubes. Both banks are connected at the bottom end to a water supply chamber $c$ and separated the one from the other for the greatest part of their length by a guide wall $d$ for the flue gas which starts from the water supply chamber $c$. From a feed drum $f$, partly filled with water the water flows to the chamber $c$ through a downcomer $g$. According to the invention the tubes of the low efficiency bank $b$ and at the top in a steam discharge chamber $h$, whilst the tubes of the high efficiency bank $a$ pass along side the chamber $h$ and through the roof $i$ and directly into an exterior unheated high efficiency drum $k$.

A tube $l$ conducts the steam generated in the low efficiency bank $b$ into the drum $f$. The water spaces of the drums $f, k$ are connected with one another by a pipe $m$ and the steam spaces of the same by the pipes $n$. The united steam is discharged through a pipe $o$ connected to the pipes $n$. Between the bank $b$ and a guide wall $p$ for the flue gas downwardly directed from the drum $f$ a superheater $q$ is arranged. From the furnace $r$, arranged at one side, the flue gases are conducted in the direction of the arrow $s$, by means of the guide walls $d$ and $p$ and of the transverse guide walls $t$ joined to the same, in serpentine lines so that they flow also along the superheater $q$, and the waste gases escape, in the commonly used manner, in downward direction after having passed again through the low efficiency bank of water tubes.

The pipes $m$, $n$, $o$ and the drums $k$, $f$ are arranged, according to the invention, at the outer side of the space which is required for removing the tubes of the low efficiency bank in upward direction. By this arrangement the great advantage is obtained, that, as these tubes can be removed in upward direction, the boiler plant can be very low, owing to the fact that the large space which had, up to the present time, to be provided under the chamber for the downward removal of the low efficiency bank of water tubes, is no longer necessary.

Figure 3:
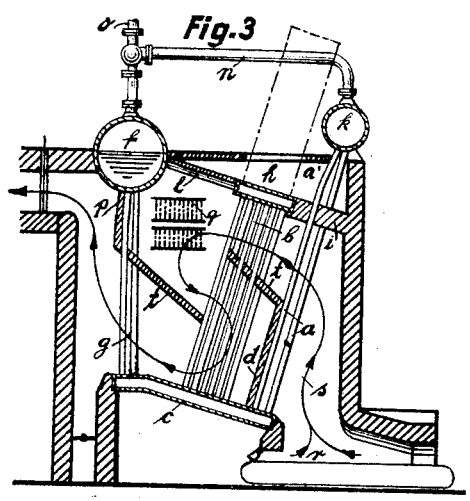
Fig. 3 shows in elevation a single boiler heated on one side with connection of the maximum efficiency bank of water tubes to the steam collecting drum of the same, said connection being arranged above the highest water level.

The drum $k$ as shown in Fig. 3 is mounted at such high distance above the drum $f$, that the tubes of the maximum efficiency bank $a$ extend even above the highest water level in the feed drum $f$ so that their ends remain dry and form their own evaporation surface. In this manner the free discharging of the steam from the tubes is still further improved. The water tubes, connecting the drums $f$ and $k$ can be omitted in this case.

I claim:—

A sectional water tube boiler comprising in combination, a most strongly heated steep high efficiency bank of water tubes consisting of a few tubes only, a less strongly heated steep low efficiency bank of water tubes consisting of a greater number of water tubes, a water supply chamber to which the bottom ends of the water tubes of said two banks are connected, a guide wall for the flue gas upwardly extending from said water supply chamber and separating said two banks, the one from the other on the greatest part of their length, a steam discharge chamber into which the top ends of the water tubes of said low efficiency bank end, a feed drum partly filled with water, a downcomer connecting said feed drum to said water supply chamber, a high efficiency steam collecting drum to which the upper ends of the water tubes of the high efficiency bank are connected, a pipe connecting the water space of said high efficiency drum to the water space of said feed drum, pipes connecting the steam space of said high efficiency drum to the steam space of said feed drum, and a steam discharge pipe connected to said connecting pipe for the steam spaces of the high efficiency drum and of the feed drum, and said connecting pipes for the water and steam spaces of the high efficiency drum and for the feed drum, the steam discharge pipes, and the high efficiency drum and the feed drum being so disposed to present an unobstructed pathway above the low efficiency bank of tubes to permit removal in an upward direction of the water tubes of the low efficiency bank of water tubes.

In testimony whereof I affix my signature.

GEORG MAAS.